May 9, 1933.  J. H. DOMINA  1,908,412
TESTING MACHINE
Filed Feb. 27, 1931   3 Sheets-Sheet 1

INVENTOR
JAMES H. DOMINA
BY
ATTORNEY

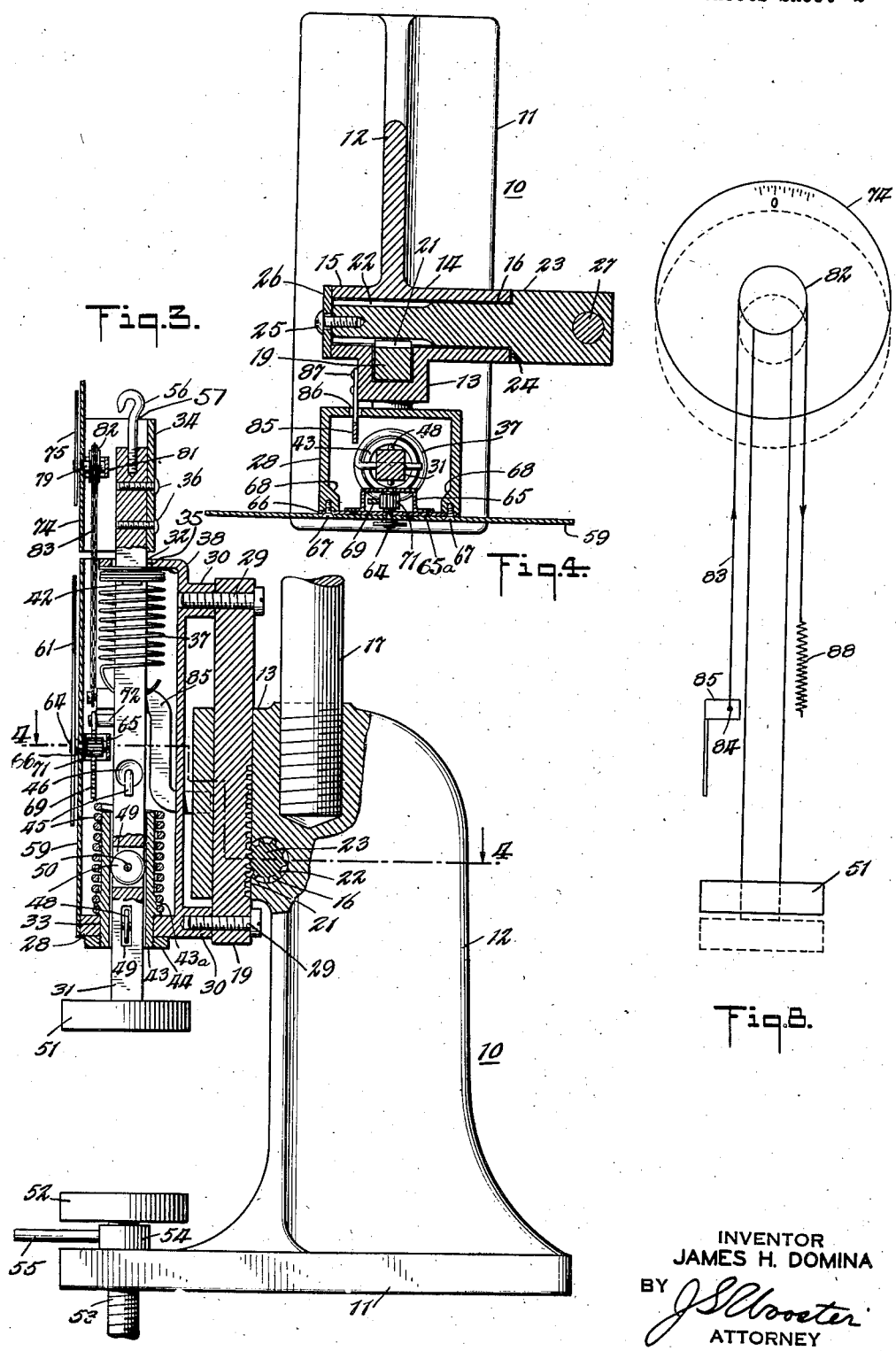

May 9, 1933.  J. H. DOMINA  1,908,412
TESTING MACHINE
Filed Feb. 27, 1931   3 Sheets-Sheet 3
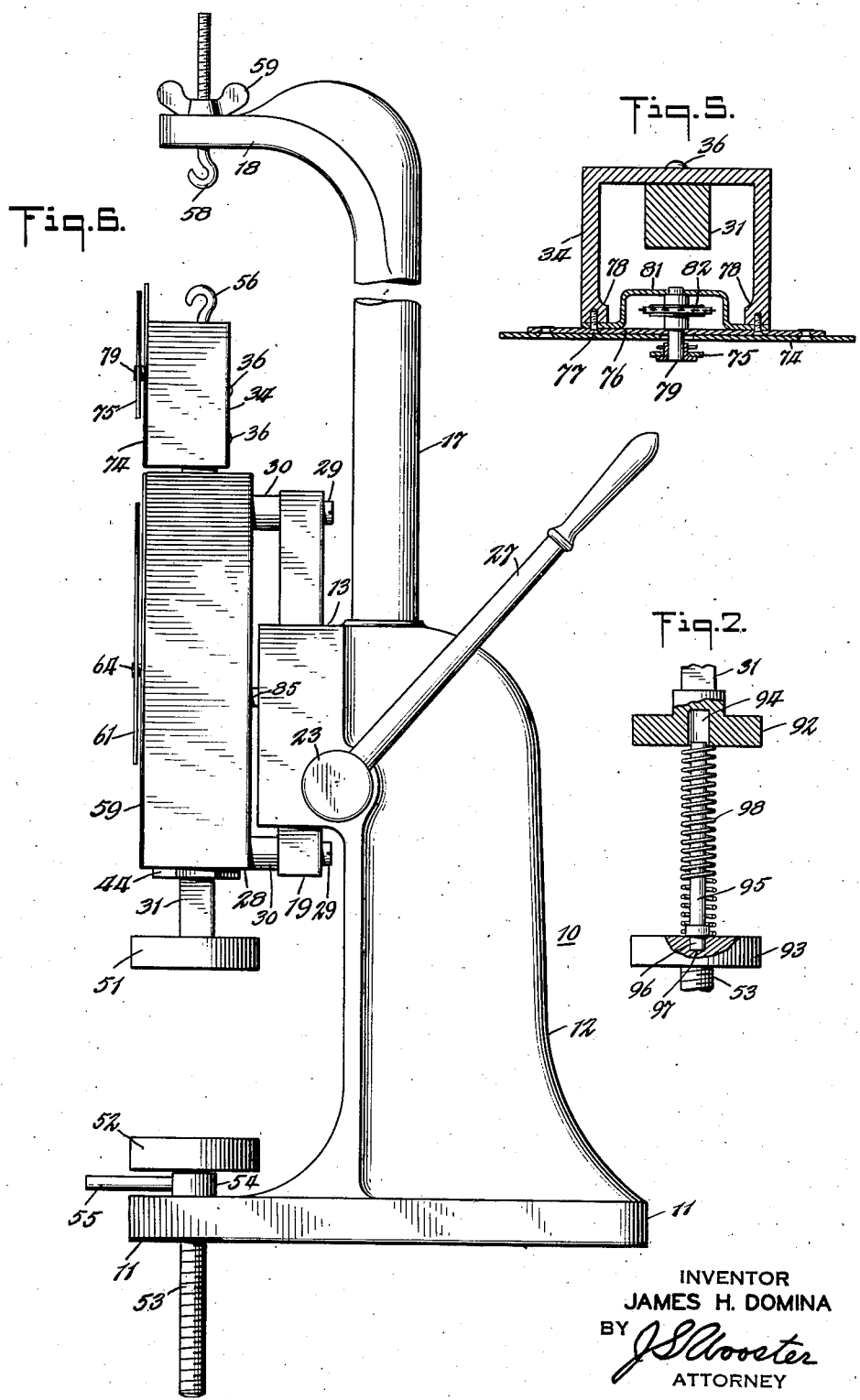

Patented May 9, 1933

1,908,412

UNITED STATES PATENT OFFICE

JAMES H. DOMINA, OF PATERSON, NEW JERSEY, ASSIGNOR TO JOHN CHATILLON & SONS, OF NEW YORK, N. Y., A CORPORATION OF NEW YORK

TESTING MACHINE

Application filed February 27, 1931. Serial No. 518,618.

This invention relates to testing machines and it has particular relation to machines for testing objects that are to be subjected to compression and extension stresses.

An object of the invention is the provision of an improved machine for testing objects, for their ability to withstand compression and extension stresses.

Another object of the invention is the provision of a testing machine that shall indicate simultaneously and directly the force applied to an object being tested, and the deflection produced thereby, without compensating for the weight of the object or any part of the machine.

According to this invention, means are provided for actuating an indicator in response to the deflection of a resilient member upon the application of force to an object to be tested, and for simultaneously actuating a second indicator that is responsive to the deflection of the object. Specifically, this includes a resilient member connecting two relatively movable members, one of which engages the object to be tested, and means for moving the members to apply force to the object so that the relative motion of the members against the restraining force of the resilient member actuates the force indicator operating mechanism; and it also includes operating mechanism for the deflection indicator that is actuated by movement of the member which engages the object.

The invention will be better understood from the following description, when read in conjunction with the accompanying drawings, in which:

Fig. 3 is a side elevational view, partially in section, showing the mechanism of the testing machine of Fig. 1.

Fig. 4 is a sectional view taken on the line 4—4 of Fig. 3.

Fig. 5 is a sectional view taken on the line 5—5 of Fig. 1.

Fig. 6 is a side elevational view of the testing machine of Fig. 1.

Fig. 7 is a view showing an alternate method and means for holding objects to be tested.

Fig. 8 is a diagrammatic view showing the principle of operation of the deflection indicator.

Figures 1, 2:
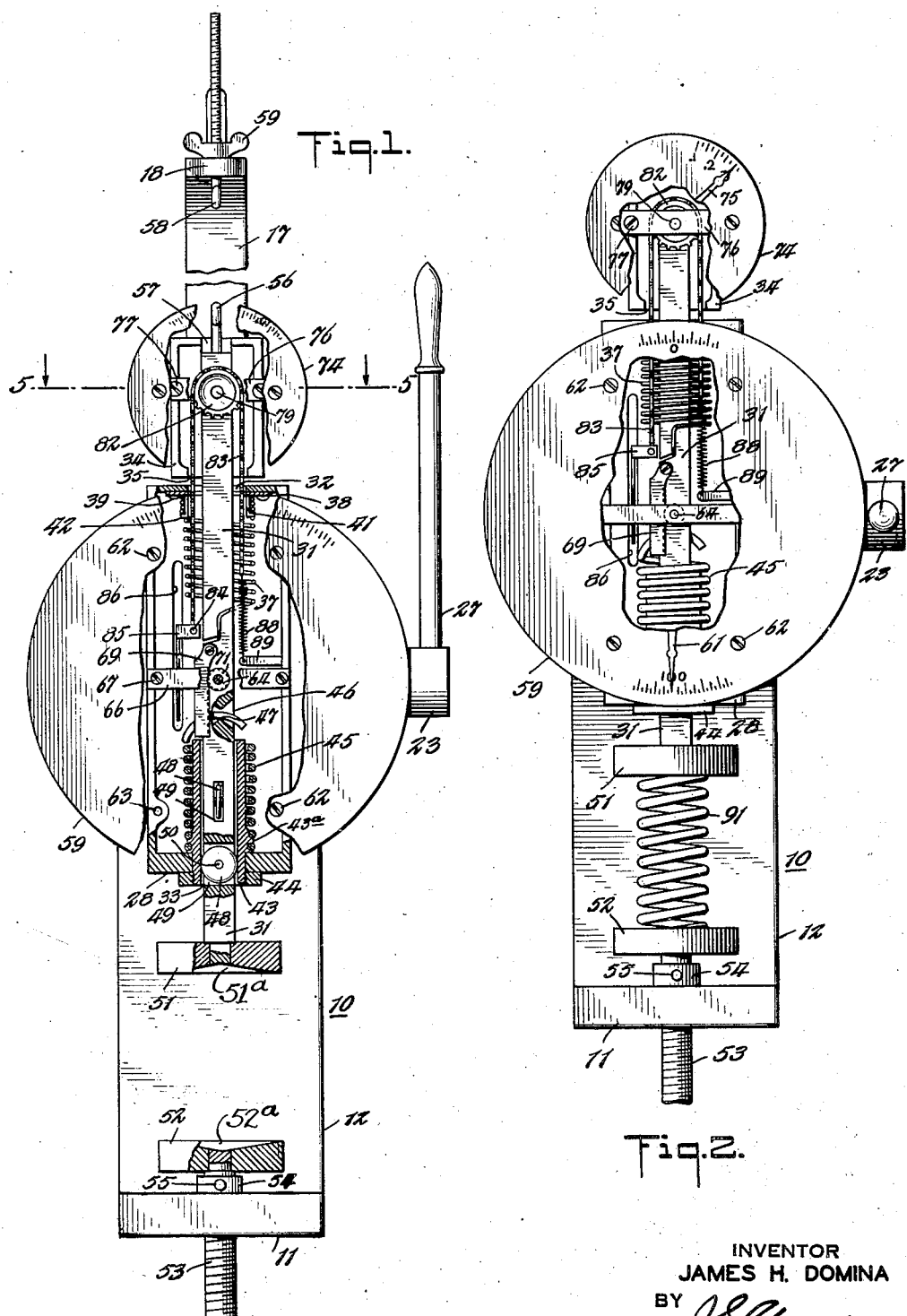
Figure 1 is a view, partially in elevation and partially in section, of a testing machine constituting one embodiment of this invention.
Fig. 2 is a view, partially in elevation and partially in section, of a testing machine of this invention in which a spring is being tested for compression.

Referring to the drawings, the testing machine comprises a frame member 10 consisting of a base plate 11, a vertically extending web member 12, which changes its configuration near the top to form a shoulder member 13 and lateral extensions 14 and 15, having a circular opening 16 extending therethrough. A post 17 mounted on top of the frame 10, is threadedly affixed thereto and extends upwardly, changing its direction and configuration near the top to form a flat bar 18 that is substantially horizontal.

A bar 19, extending longitudinally through an opening in the shoulder member 13, is supported thereby and is adapted to be raised and lowered by means of a rack 21 and pinion 22. The rack consists of a plurality of teeth cut in the bar 19, and the pinion is formed by cutting teeth on the end of a shaft 23, that extends through the openings 16 in the lateral extensions 14 and 15. The shaft 23 is increased in diameter at one end to form a collar 24 that abuts against the end of the lateral extension 14, and the shaft is held in the lateral extensions, free to rotate, by means of a screw 25, that extends through a plate 26 and the end of the shaft 23, the plate 26 abutting against the end of the lateral extension 15. The shaft 23 is rotated by means of a lever arm 27 affixed to the end thereof.

An open face casing or housing 28 is carried by the bar 19 and is attached thereto by means of bolts 29, that extend through the bar near the opposite ends thereof and into interiorly threaded arms 30, disposed at the top and bottom of the casing 28, formed integrally therewith and extending laterally from the rear thereof, the ends of the arms 30 being in abutting relation to the bar 19.

A movable runner or rod 31 extends longitudinally through the casing 28, extending through openings 32 and 33 in the top and bottom walls, respectively, and into a second casing or housing 34 through an opening 35, the casing 34 being above the casing 28. The rod 31 carries the casing 34 by being affixed to the rear wall thereof by means of screws 36. The rod 31 is supported by a spring 37 that is disposed around it and suspended from the top wall of the casing 28 by means of a plate 38, surrounding the rod and attached to the casing by means of screws 39, and provided with downwardly extending members 41 having flanges 42 projecting outwardly therefrom. The upper turns of the spring are disposed against the members 41 between the plate 38 and the flanges 42, and the lower end of the spring extends through an opening in the rod 31 thereby supporting it. A sleeve 43 surrounds the rod at the lower end of the casing 28, extending through the opening 33 in the bottom thereof. The sleeve 43 is provided with a shoulder 43a that rests on the bottom wall of the casing 28, and is provided with a spiral groove. The sleeve is threaded at its lower end to receive a lock nut 44, to lock it in position. A spring 45, designated the load spring surrounds the sleeve, the lower turns of the spring fitting into the spiral, and the uppermost turn of the spring being bent to extend through an opening 46 in the rod 31, and resting on a knife edge as at 47. By this connection the rod 31 and the casing 28 are resiliently connected together. The tension of the spring 37 is adjusted until the knife edge 47 is exerting a slight force on the spring to prevent backlash when force is impressed on the specimen and there is relative motion between the casing and the rod. The machine may be calibrated before complete assembly of the machine by turning the spring 45 in the groove thereby varying the tension of the spring. Rollers 48 are disposed in slots 49 cut transversely in the rod one above the other and are held by shafts 50 that extend into openings in the rod 31. The sleeve 43 functions as a guide for the rod 31, and the rollers 48 aid in maintaining the rod centrally in the sleeve and reducing friction thereby facilitating the movement of the rod 31.

A self-centering disc 51 having a V-shaped notch 51a (Fig. 1) is attached to the bottom of the rod 31, and cooperates with a second self-centering disc 52 having a V-shaped notch 52a to hold a specimen that is to be given a compression test. The disc 52 is held by an adjustable screw 53, that extends through a threaded opening in the base plate 11 and is held in a predetermined position by means of a lock nut 54. A lever arm 55 is provided to loosen the lock nut 54 to permit the disc 52 to be moved, thus varying the distance between the discs, in order to accommodate specimens of different lengths. Step chucks may be employed instead of the discs for holding the specimen.

A hook 56, disposed in the upper extremity of the rod 31, extends through an opening 57 in the casing 34 and cooperates with a similar hook 58, held by the flat bar 18, to hold a specimen that is to be given an extension test. The hook 58 is held in a predetermined position by means of a lock nut 59, and is threadably adjustable in lock nut 59 to vary the distance between hooks, in order to accommodate specimens of different lengths.

When a specimen is to be tested, it is attached to the two hooks 56 and 58 or it is placed between the two discs 51 and 52, as illustrated in Fig. 2. Force is applied by moving the lever arm 27 downwardly, thereby causing the casing 28 and the rod 31 to move downwardly and transmitting the applied force to the specimen. The specimen reacts with a force, equal and opposite to the applied force, and tends to prevent the downward movement of the casing and rod, but is opposed by the load spring 45 which connects the casing and rod together. If the specimen be a yieldable one, such as a spring, it changes in length a certain amount upon the application of force due to the action of the spring 45. As the impressed force is increased the spring offers a greater resistance to a further change in length than can be completely overcome by the load spring 45 and the casing 28 moves downwardly more than the rod 31, effecting relative motion between them against the restraining force of the spring 45 and causing distention or elongation of the spring.

Resistance in pounds offered by the specimen tested is indicated on a dial 59 by means of an indicator 61. The dial 59 is mounted on the front of the casing 28 and is affixed thereto by screws 62 that extend into bosses 63 formed integrally with the side walls of the casing. The indicator 61 is mounted on a shaft 64 extending through an opening in the center of the dial 59 and held by two flat straps 65 and 66, the strap 65 having the shape shown in Fig. 4, and being attached to the strap 66 by screws 65a. The strap 66 extends across the front of the casing 28 and is attached thereto by screws 67 that extend into bosses 68 formed integrally with the side walls of the casing. The indicator is actuated by a rack 69 and a pinion 71, the rack depending from a stud 72 that is affixed to the rod 31, and the pinion being mounted on the shaft 64.

The dial 59 is provided with a scale graduated in pounds, and the elements of the machine are so designed, that the indicator is moved around the dial in exact proportion to equal units of applied force. For example, with a load spring designed for two hundred pounds tensile strength, and a scale so graduated that a complete revolution of the indicator represents two hundred pounds, the indicator will be moved completely around the dial, when the lever arm is moved from the position of zero applied force to the position of maximum applied force.

As the specimen deflects, or changes in length with applied force, the amount of deflection is indicated on a dial 74 by an indicator 75. The dial 74 is provided with a scale so graduated that the deflection of the specimen may be indicated thereon in convenient units. The dial 74 is mounted on the front of the upper casing 34 by being attached to a strap 76 that extends across the front of the casing and is secured thereto by screws 77 which extend into bosses 78 formed integrally with the side walls of the casing. The indicator is mounted on a shaft 79 extending through an opening in the center of the dial 74 and the strap 76 and is supported by a strap 81 that is secured to the side walls of the casing by means of the screws 77.

The deflection indicator is operated by a sprocket wheel 82 and chain 83, the sprocket wheel being mounted on the shaft 79 between the straps 76 and 81. The chain 83 depends from the sprocket wheel 82 through the openings 35 and 32 in the casings 34 and 28, respectively, into the lower casing 28, one end of the chain being attached at 84 to one end of a stationary S-shape arm 85 that extends through a slot 86 in the rear of the casing and is attached to the shoulder member 13 at 87. The other end of the chain 83 is attached to one end of a helical spring 88, the other end of which is attached to an arm 89 that is affixed to the side wall of the casing 28.

The point 84 is fixed with respect to the rod 31 and the center line of the sprocket wheel 82. When the rod 31 moves downwardly the distance between the point 84 and the center line of the sprocket wheel decreases and the chain 83 is pulled over the sprocket wheel by the action of the spring 88, as illustrated in Fig. 8, thereby actuating the deflection indicator 75.

Fig. 2 illustrates a spring 91 being tested for compression. In the operation of the machine the disc 52 is so adjusted that the space between the discs 51 and 52 is just sufficient to permit the spring to be inserted between them. The lever arm 27 is moved downwardly until the spring is held without compressing it. There will be small indications on the dials 59 and 74, which are effected by the application of the slight force necessary to hold the spring and the movement of the rod. The indicator 75 is adjusted by increasing the distance between discs 51 and 52 to its zero position, and upon a further downward movement of the lever arm 27, the spring 45 is elongated, permitting relative motion of the casing 28 and the rod 31, which causes the rack 69 to rotate the pinion 71 to actuate the indicator 61. The applied force compresses the spring 91, causing a downward movement of the rod 31, thus changing the distance between the center line of the sprocket wheel 82 and the point 84 on the arm 85, and actuating the deflection indicator 75. The applied force is illustrated as one hundred pounds, as indicated on the dial 59, causing a deflection of the spring of three tenths of an inch, as indicated on the dial 75.

While Fig. 2 illustrates a spring being tested for compression, it is obvious that if a spring be connected to the hooks 56 and 58, and the lever arm 27 moved downwardly, there will be a downward movement of the rod 31 and relative movement between the rod 31 and the casing 28, thereby actuating the indicators 61 and 75.

As the casing is supported by the frame 10 and the rod 31 held by the spring 37, in readiness to function upon the application of force to the specimen, and the weight of the specimen carried by the disc 52, or the hook 58, it is evident that the force applied to the specimen, and the deflection thereof are indicated simultaneously and directly without it being necessary to compensate for the weight of the specimen or any part of the machine.

When it is desired to test a light spring for compression, that may buckle on the application of force, it is necessary to provide means for supporting the spring to prevent buckling. In Fig. 7 is illustrated an alternate pair of discs 92 and 93 for holding a light spring that is to be tested. The disc 92 is attached to the rod 31 and is provided with a recess 94 large enough to receive circular member 95, that has a projection 96 on the bottom thereof to fit into a recess 97 in the disc 93. The spring 98 to be tested is disposed around the member 95 and upon the application of force, the spring is prevented from buckling, the member 95 passing into the recess 94 upon the deflection of the spring.

Members 95 of different diameters are provided for springs of different diameters and different discs 92 are substituted with recesses 94 large enough to permit the entrance of the member 95 upon the deflection of the spring 98. The diameter of the projection 96 may be the same on all the different size members 95, thus permitting the use of a single lower disc with the different sizes of the members 95.

Among the advantages of this invention may be mentioned, the simultaneous and direct indication of the applied force. Calibration of the machine, to accord with a predetermined force scale, is secured with ease and may readily be done by turning the spring 45 in groove of the sleeve to change its tension. By placing a standard spring, having a certain deflection for a definite applied force, between the discs 51 and 52, or attaching it to the hooks 56 and 58 and moving the lever 27 downwardly until the known deflection of the standard is obtained a certain force is indicated on the dial 59. If the force indicated is different from the force necessary to produce the deflection of the standard the adjustment may easily be made by adjusting the tension of the spring 45. Facility of adjustment of the tension of the spring 45 affords a simple means for compensating for irregularities in the load characteristics of springs of the same type.

Since many modifications may be made in the construction of the testing machine, as hereinbefore described, I do not wish to be limited otherwise than by the scope of appended claims.

The invention claimed is:

1. A testing machine comprising in combination a member, a second member relatively movable thereto, means for resiliently supporting said second member from said first member, means for resiliently connecting the two members together, means for holding a specimen to be tested, one of said members being connected to the specimen holding means, means for actuating the members to apply force to the specimen, means for indicating the applied force and means for indicating the deflection of the specimen produced by said force.

2. A testing machine comprising in combination a member, a second member relatively movable thereto, means for resiliently supporting said second member from said first member, means for resiliently connecting the two members together, means for holding a specimen to be tested, one of said members being connected to the specimen holding means, means for actuating the members to apply force to the specimen, means for indicating the applied force and means for indicating the deflection of the specimen produced by said force, and means for preventing buckling of the specimen upon the application of force.

3. A testing machine comprising in combination a member, a second member relatively movable thereto, means for resiliently supporting said second member from said first member, resilient means for connecting the two members together, means for holding a specimen to be tested, one of said members being connected to the specimen holding means, means for actuating said members to exert force on the specimen, an indicator responsive to the distention of the resilient means and an indicator responsive to the movement of the member connected to the specimen holding means.

4. A testing machine comprising in combination a member, a second member, means for resiliently supporting said second member from said first member, a spring connecting the two members together, means for holding a specimen to be tested, the second member being connected to the specimen holding means, means for actuating the two members to exert force on the specimen, means responsive to the relative motion of the two members against the action of the spring for indicating the applied force and means responsive to the movement of the second member for indicating the deflection of the specimen.

5. A testing machine comprising in combination a member, a second member, means for resiliently supporting said second member from said first member, a spring connecting the two members together, means for holding a specimen to be tested, the second member being connected to the specimen holding means, means for actuating the two members to exert force on the specimen, means responsive to the relative motion of the two members against the action of the spring for indicating the applied force, means responsive to the movement of the second member for indicating the deflection of the specimen, and means for preventing buckling of the specimen upon the application of force.

6. A testing machine comprising in combination a member, a second member, means for resiliently supporting said second member from said first member, a spring connecting the two members together, means for holding a specimen to be tested, the second member being connected to the specimen holding means, means for actuating the two members to exert force on the specimen, means responsive to the relative motion of the two members against the action of the spring for indicating the applied force, means responsive to the movement of the second member for indicating the deflection of the specimen, means for adjusting the tension of the spring and means for preventing buckling of the specimen upon the application of force.

7. A testing machine comprising in combination a member having an opening, a second member extending through said opening, means for resiliently supporting the second member from the first while permitting relative motion between them, a spring disposed about the second member and connecting the two members together, means connected with the second member for holding a specimen to be tested, means for actuating the members to apply force to the specimen, means responsive to the elongation of the spring for indicating the applied force and means responsive to the movement of the second member for indicating the deflection of the specimen.

8. A testing machine comprising in combination a stationary member and a movable member adapted to support a test specimen between them, a second movable member, means for resiliently connecting the two movable members together, means for resiliently supporting the first movable member from the second while permitting it to move relatively thereto, means for actuating the movable members to apply force to the test specimen, means for indicating the applied force and means for indicating the deflection of the specimen produced by said force.

9. A testing machine comprising in combination a stationary member and a movable member adapted to support a test specimen between them, a housing for said movable member, means for resiliently connecting the housing and the movable member, means for resiliently supporting the movable member from the housing while permitting relative motion therebetween, means for actuating the housing to apply force to the test specimen, means for indicating the applied force and means for indicating the deflection of the specimen produced by said force.

10. A testing machine comprising in combination two members for supporting a test specimen, a runner connected to one of said members, a housing having an opening, the runner extending through the housing, means for resiliently supporting said runner from said housing, a spring connecting the housing and the runner, means for actuating the housing to apply force to the specimen, means responsive to the deflection of the spring for indicating the force and means for indicating the deflection of the specimen produced by said force.

11. A testing machine comprising in combination a casing, a resilient member connected thereto, a runner connected to the resilient member and means for resiliently supporting the runner from the casing, means cooperating with the runner for supporting a specimen to be tested, means for actuating the casing to exert force on said specimen, indicating means responsive to the elongation of the resilient member, and indicating means responsive to the movement of the runner for indicating the deflection of the specimen.

12. A testing machine comprising in combination a housing having an opening, a runner extending through said opening, means for resiliently supporting said runner from said housing, a resilient member having one end connected to the housing and the other end connected to the runner, means cooperating with the runner to support a specimen to be tested, means for actuating the housing to apply force to the specimen, indicating means responsive to the relative movement of the housing and the runner, and indicating means responsive to the movement of the runner.

13. A testing machine comprising in combination a housing having an opening, a runner extending through said opening, means for resiliently supporting said runner from said housing, a spring disposed about the runner one end of which is connected thereto and the other end being connected to the housing, means cooperating with the runner for holding a specimen to be tested, means for effecting movement of the casing to impress force upon the specimen, indicating means responsive to the elongation of the spring, indicating means responsive to the movement of the runner to indicate the deflection of the specimen and means for adjusting the tension of the spring.

14. A testing machine comprising in combination a housing having an opening, a runner extending through said opening, means for resiliently supporting said runner from said housing, a spring disposed about the runner one end of which is connected thereto and the other end being connected to the housing, means cooperating with the runner for holding a specimen to be tested, means for effecting movement of the casing to impress force upon the specimen, indicating means responsive to the elongation of the spring, indicating means responsive to the movement of the runner to indicate the deflection of the specimen and means for preventing buckling of the specimen upon the application of force.

15. A testing machine comprising in combination a spring, a housing having an opening, a runner extending through said opening and suspended from the top thereof by means of said spring, a coil spring surrounding the runner and connected thereto, the other end of the coil spring being connected to the housing, means cooperating with the runner for holding a specimen to be tested, means for actuating the casing to apply force to the specimen, indicating means responsive to the elongation of the coil spring, and indicating means associated with the runner and responsive to the displacement of the runner upon the deflection of the specimen.

Signed at New York, in the county of New York, and State of New York, this 21st day of February A. D. 1931.

JAMES H. DOMINA.